United States Patent [19]

Stanford

[11] Patent Number: 5,117,882
[45] Date of Patent: Jun. 2, 1992

[54] MICROBUBBLE-GENERATING AND DISPENSING DEVICES AND METHODS

[75] Inventor: Ulf H. Stanford, San Anselmo, Calif.

[73] Assignee: Corwin R. Horton, Kentfield, Calif.; a part interest

[21] Appl. No.: 232,739

[22] Filed: Aug. 15, 1988

Related U.S. Application Data

[63] Continuation-in-part of Ser. No. 17,567, Feb. 24, 1987, abandoned, which is a continuation-in-part of Ser. No. 765,791, Aug. 15, 1985, abandoned.

[51] Int. Cl.$^5$ .............................................. B64C 1/38
[52] U.S. Cl. .................................... 114/67 A; 261/81; 261/122
[58] Field of Search ................... 261/94–96, 261/100–102, 122, 81; 114/67 R, 67 A, 56; 244/207, 209; 366/127

[56] References Cited

U.S. PATENT DOCUMENTS

| 420,670 | 2/1890 | Andrel | 114/67 A |
|---|---|---|---|
| 661,303 | 11/1900 | Briggs | 114/67 A |
| 1,822,223 | 9/1931 | Klinger | 114/67 A |
| 2,366,162 | 4/1945 | Vang | 114/67 |
| 2,378,822 | 6/1945 | Barry | 114/67 |
| 3,534,699 | 10/1970 | Ruone | 114/67 |
| 3,851,861 | 12/1974 | Cummins | 366/127 |
| 3,972,494 | 8/1976 | Drews | 244/130 |
| 4,253,962 | 3/1981 | Thompson | 210/414 |
| 4,346,011 | 8/1982 | Brownstein | 210/748 |
| 4,525,219 | 6/1985 | Jones | 134/1 |
| 4,793,714 | 12/1988 | Gruber | 261/81 |

FOREIGN PATENT DOCUMENTS

| 84110151.2 | 4/1985 | European Pat. Off. |
| 1938242 | 12/1970 | Fed. Rep. of Germany |
| PCT/SE86/0-0114 | 10/1985 | PCT Int'l Appl. |

OTHER PUBLICATIONS

Madavan et al., Red. of Turb. Skin Fric. by Microbubbles, The Physics of Fluids, vol. 27, No. 2, pp. 356–363, Feb. 1984.
Feltmetal Product Information Bull. TD-881, Fibermetal Product Description Dec. 1984, Brunswick Technetics 2000 Brunswick Lane, Deland, Fl. 32724.
Feltmetal Product Information Bull. TD-831, Acoustics, Fiber Metal Properties & Design Data, Brunswick Technetics 2000 Brunswick Lane, Deland, Fl. 32724, Mar. 1982.
Feltmetal Product Information Bull. TD 600, Apr. 1981 FM 125 Feltmetal Fiber Metal: Used as an Argon Diffuser during Welding, Brunswick Technetics, 2000 Brunswick Lane, Deland, Fl. 32724.

*Primary Examiner*—Edwin L. Swinehart
*Attorney, Agent, or Firm*—Corwin R. Horton

[57] ABSTRACT

Methods and devices for generating gas bubbles including a microbubble generating cell having a microporous mat permeable to gas appied thereagainst under pressure which has a ultrasonic energy generator such as a piezoelectric transducer in wave energy communication therewith for promoting flow and impeding fouling thereof. Such mat is comprised of compressed corrosion-resistant metal fibers of a diameter of between 2 and 80 microns, has a density of less than 70% of the density of the fibers and an average pore diameter of between 5 and 100 microns. Such methods and devices are associated with a vessel and/or a foil for a vessel for generating and dispensing microbubbles along the hull surfaces to reduce friction and turbulence on the wetted surface. The foil is positioned forward of vessel bowpeak with its trailing edge confronting same and has a microbubble dispenser for dispensing microbubbles in the path of the hull of the vessel.

12 Claims, 7 Drawing Sheets

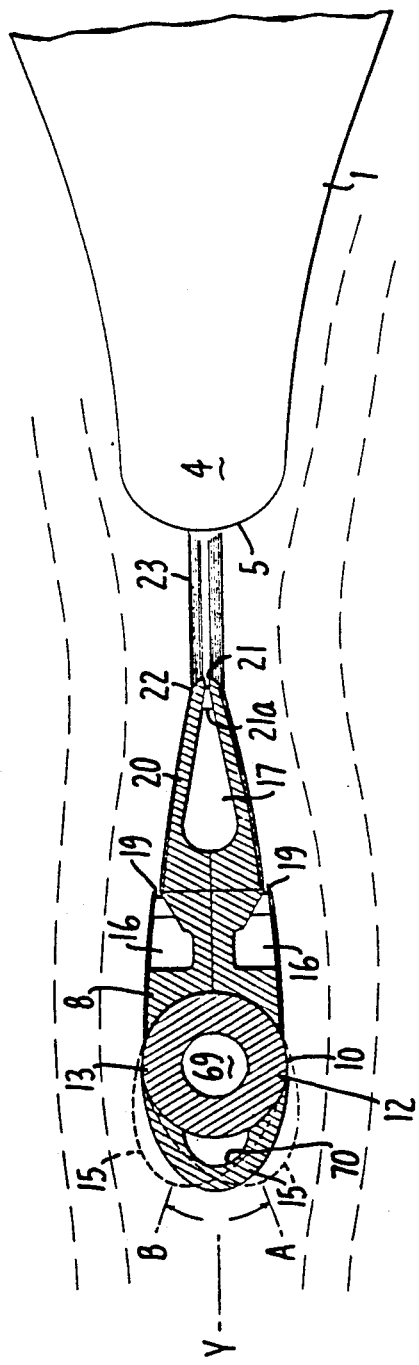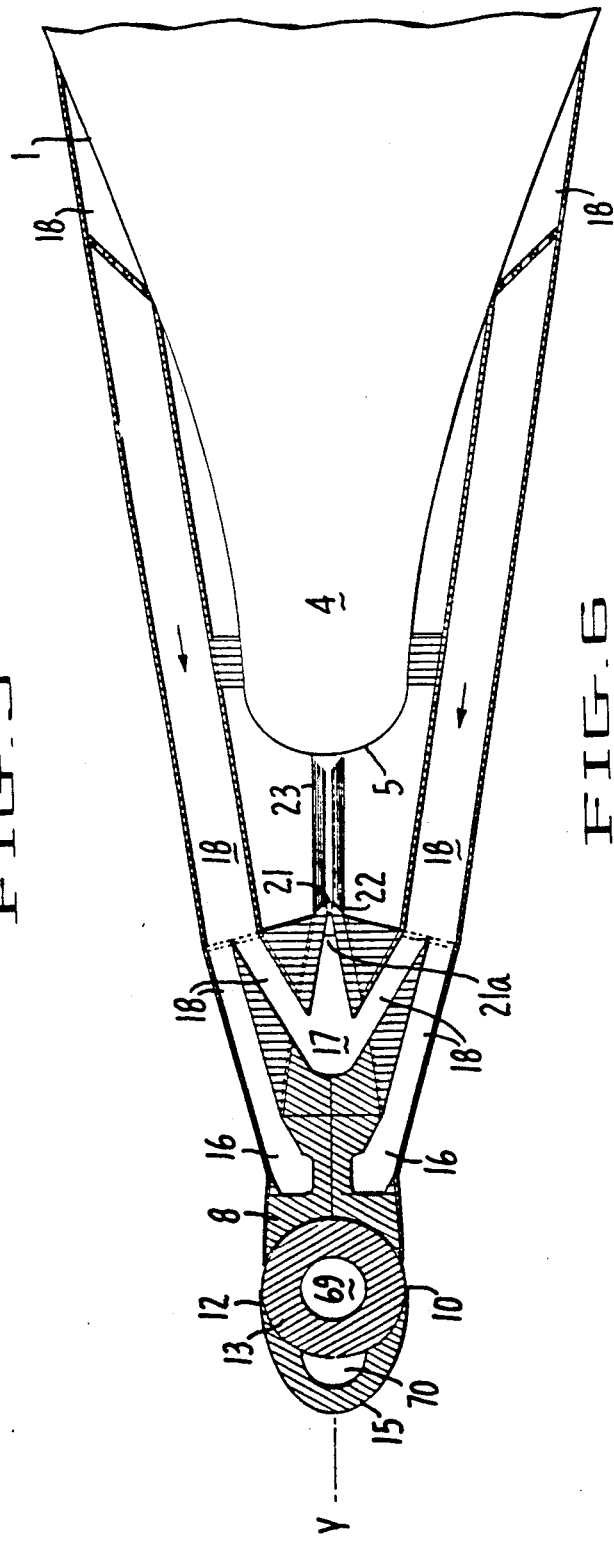

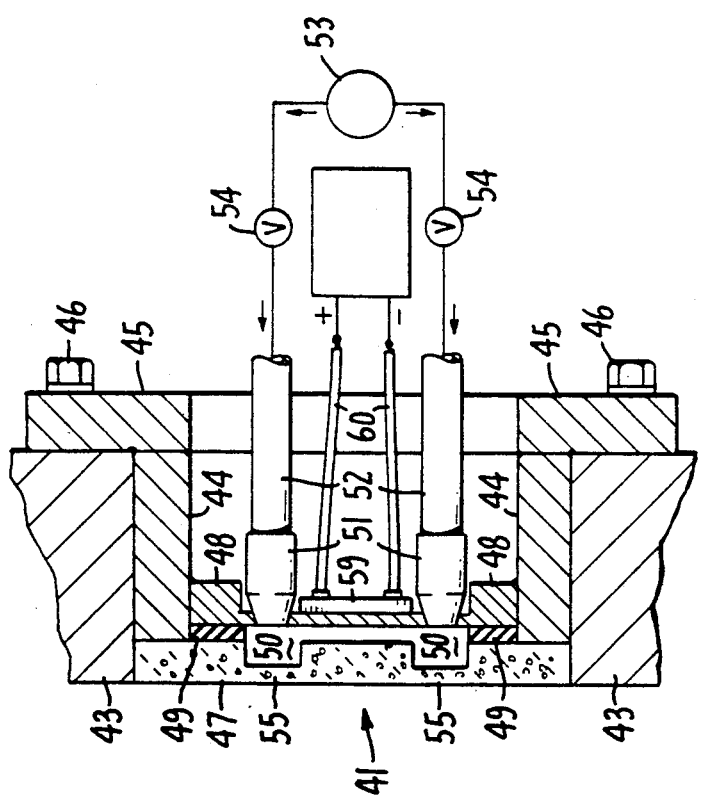
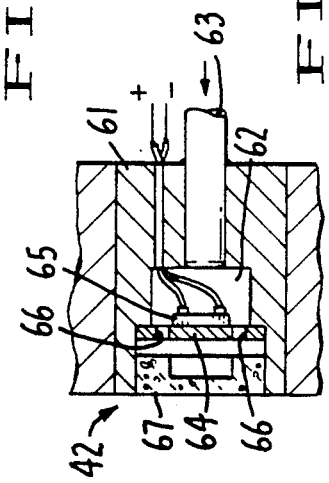

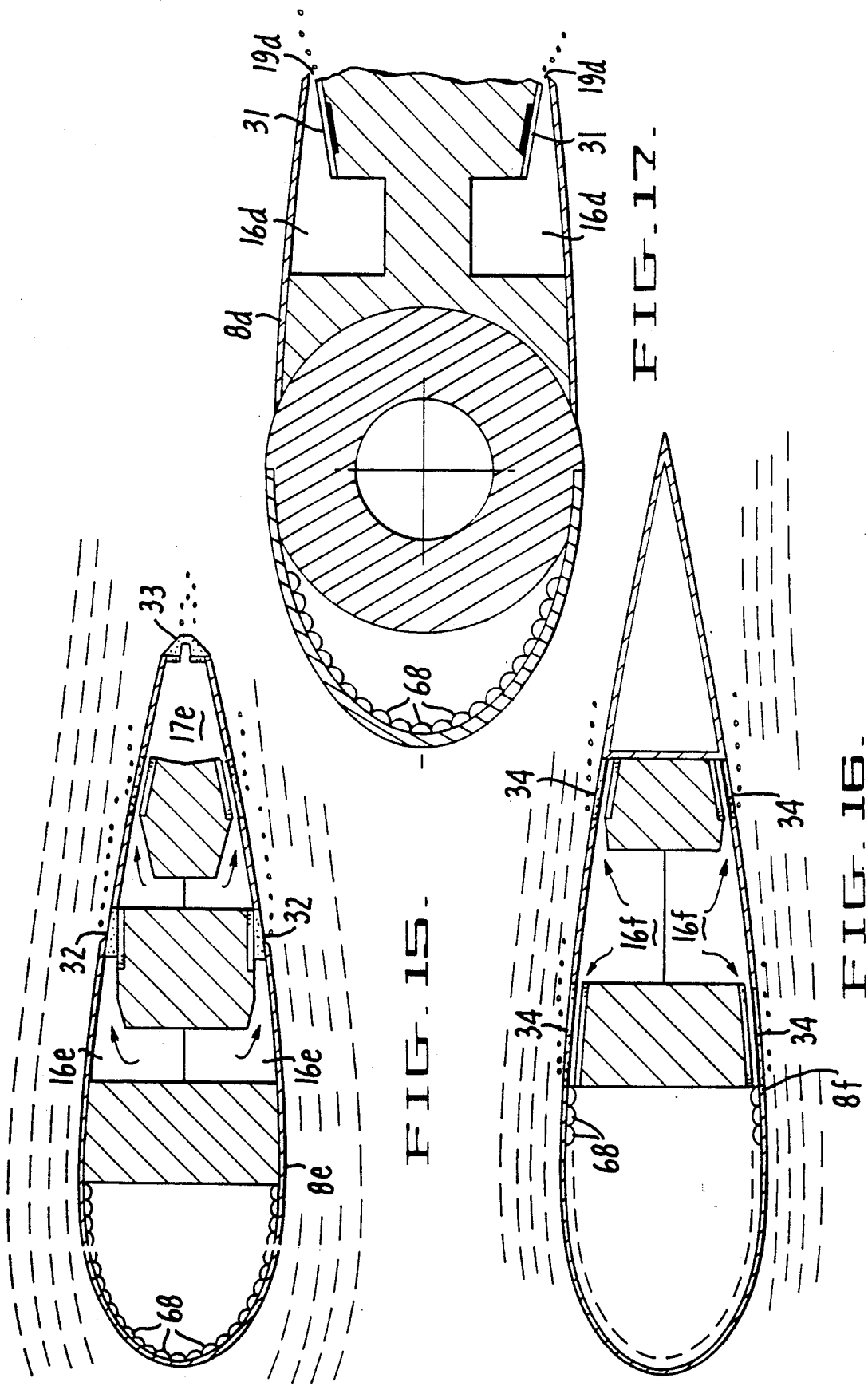

MICROBUBBLE-GENERATING AND DISPENSING DEVICES AND METHODS

RELATED APPLICATIONS

This is a continuation-in-part of U.S. patent application Ser. No. 07/017,567, filed Feb. 24, 1987 now abandoned which is, in turn, a continuation-in-part of U.S. patent application Ser. No. 06/765,791, filed Aug. 15, 1985 now abandoned.

BACKGROUND OF THE INVENTION

This invention relates to the generation of microbubbles of gas in a liquid for all applications where such microbubbles are desired and to generating and dispensing of microbubbles, particularly at the wetted surfaces of navigable vessels whereby to provide the vessel with improved performance by decreasing frictional resistance and turbulence. A vessel moving through water experiences frictional resistance at the wetted surface below the water line. As the speed of the vessel increases the turbulence created by the hull moving through the water increases rapidly until frictional forces become the practical barrier to higher speed. The energy required to propel the vessel increases correspondingly. Improving speed and efficiency are recognized as the primary goals and activities in the naval arts and decreasing frictional resistance is seen as the key to these goals.

Conventional devices for bubble generation as, for example those described in European Patent Application No. 84110151.2 (publication no. 0 135 822), constitute gas permeable plates with means for introducing gas under pressure on one side so that it is forced through the plate to the other side and into a liquid which is at the other side. Usually such plates are made porous by mechanical treatment, as by punching, piercing, boring, etc. such that the bubbles produced are relatively large and/or the throughput at reasonable pressures is quite limited. Smaller bubbles on the order of 50 microns or less (i.e. microbubbles) have been produced utilizing microporous metal plates made of powdered metal which is then sintered and subjected to an etching process to create the pores, as described in the papers of Madavan, Deutsh and Merkle published in the Journal of Fluid Mechanics (1985), vol. 156, pp. 237–245, titled "Measurement of local skin friction in a microbubble-modified turbulent boundary layer" and in Phys. Fluids 27 (2), February 1984, entitled "Reduction of turbulent friction by microbubbles" and in the references cited in these papers. However the energy required for producing the microbubbles utilizing these plates is so great as to even exceed the energy saved in the application of the microbubbles thus generated for reduction of skin friction at the interface between the bubble-laden water and the wetted surface along which it moved.

In International Patent Application No. PCT/SE86/00114 fabrics with micropores, particularly polyester fabrics, are suggested for producing microbubbles. A flexible membrane forming a wall of the plenum behind the microporous fabric is subjected to mechanical vibrations to create pressure variations, presumably to promote bubble production. It is unlikely that such fabrics with or without vibrations of the magnitude contemplated would be capable of producing microbubbles in adequate volume and at a reasonable pressure differential. It is even less likely that the microbubbles would be of relatively uniform size and without a substantial fraction of larger bubbles that are not only inefficient but also detrimental to some applications such as friction reduction at the wetted surface of a vessel. As microbubbles having average diameters of less than 60 microns have been found to be the most effective in reducing friction and for other uses as well, if they can be produced in adequate volume economically and without the coproduction of larger bubbles, the foregoing prior art presents serious limitations.

In a marine environment, bubble generating devices are constantly exposed to the attack of microorganisms, minute aquatic life and other foreign matter that can quickly foul a microporous material used for bubble generation. Introduction of anti-fouling chemicals has been suggested but they are difficult to apply on an ongoing basis and are only of limited effectiveness. Ultrasonic energy has been employed for cleaning materials in a liquid bath by so-called cavitation cleaning by the implosion of vapor bubbles generated in the liquid by the wave energy as illustrate in U.S. Pat. Nos. 4,525,219, 4,253,962 and 4,346,011. In the latter two patents, the wave energy scours off particles at the influent side of a screen or microporous filter that impede transfer of the liquid therethrough, by causing cavitation in the liquid to remove or agglomorate the particles. In addition to other conventional techniques ultrasonic cleaning, presumably in a liquid bath by the cavitation technique, has been suggested for cleaning fiber metal acoustic materials. However, ultrasonic energy has not heretofore been applied in the generation of microbubbles.

Fiber metal is the descriptive name that has been given to felted metal fibers which are produced in various configurations including molded shapes, sheets, rings, pads, etc. and in varying degrees of porosity and density. These materials have been employed in acoustical applications, abrading pads and as a filter, particularly for gases. A fiber metal sheet construction has also been used for as a diffuser for Argon to provide an inert atmosphere adjacent the outflow face of the sheet for welding operations. Heretofore, fibermetal has not been employed in connection with the generation of microbubbles.

An extremely thin layer of water immediately next to the surface of the vessel below the water line(wetted surface) is termed the boundary layer. In this layer most of the shear forces of frictional resistance take place. Microscopic air or other gas bubbles, i.e. microbubbles, have been proposed for reducing friction on a vessel by their introduction into this boundary layer. This technique appears to have potential but there are serious drawbacks and limitations in the means which have been proposed for generating microbubbles, and the means proposed for introducing and distributing them.

PCT/SE86/00114 and other references disclose positioning of a microporous material flush with the hull wall of a vessel in order to distribute bubbles into the flow adjacent the hull. As friction reduction is effected only adjacent and aftwardly of the device, such placement correspondingly limits their effectiveness, particularly at the bow regions where friction reduction can produce the most effect.

Various proposals have been made for dispensing bubbles in advance of a vessel, as for example shown in U.S. Pat. Nos. 420,670, 661,303, 1,822,223, 2,378,822, 3,534,699 and 3,972,494. However, in each case the shape and configuration of the dispensing apparatus is such as would create turbulence and drag that would at the least severely limit overall effectiveness and/or the location of the apparatus with respect to the hull would greatly limit or negate effectiveness.

Each of U.S. Pat. Nos. 661,303 and 2,378,822 disclose an attachment for the bow of a vessel which is mounted over the apex and extends aft for a distance. Gas is discharged at holes or ports along the aft margins. At least in the case of U.S. Pat. No. 2,378,822 the forwardly facing portion of the attachment is streamlined to match to some extent the bow which it covers. This will reduce to some degree turbulence created by the attachment as compared to a totally bluff body (having blunt shapes that create a rapid increase of pressure gradient downstream). However, the added resistance and drag due to this structure will be substantial because elements of the attachment necessarily extend to the outside of the bow, thus creating turbulence, particularly at the necked in stern portion and at the discontinuities created by the sternward edges. Additionally as the location of the bubble release is aft of the bow apex, there is no coverage at the area which is typically the most important with regard to creation of turbulence. Nor are these attachments capable of effectively spreading bubbles appreciably outward of the boundary layer at the bow for the purpose of reducing viscosity in the sublayers.

In the other disclosures nozzles or perforated diffuser pipes are positioned below the waterline in advance of the bow to emit bubbles, using air supplied by connecting pipes from the vessel. Full coverage with bubbles of the field in advance of the bow is possible in this fashion. However, for the most part these systems are constituted of bluff bodies which themselves cause appreciable turbulence in the water passing the bow, thus they detract significantly from any friction reduction on the hull by the emitted bubbles. In U.S. Pat. Nos. 1,822,223 and 3,534,699 some streamlining is provided for the bubble dispensing devices, in the former patent perforated flat plates and oval pipes positioned directly in front of the side and bottom margins of the hull at its widest and a tapered bulb-shaped aspirator confronting the bow at the keel line in the later. However, such shapes are far from optimal in minimizing frictional resistance and turbulence and the design and placement of these devices with respect to the bow severely limit the effective distribution of the microbubbles adjacent the oncoming vessel. The bow dispaces water outwardly and therefore dispensing bubbles from points confronting the frontal, full-width profile of the hull will result in movement of many of the bubbles too far outboard of the hull as it passes. Dispensing from a concentrated location as with the bulb aspirator also greatly limits effective distribution of the bubbles adjacent the bow.

SUMMARY OF THE INVENTION

In accordance with the present invention, an efficient and effective system is provided for the generation and distribution of microbubbles in a unique and energy efficient manner. It has been discovered that fiber metal mats appropriately designed and used in accordance with this invention, are uniquely suitable for production of a high volume of microbubbles at surprisingly modest pressures and energy consumption. A microbubble generating cell is provided having a gas supply under pressure at one side of a microporous plate with the other side of the plate exposed to a body of water, preferably a water stream flowing tangentially to the plate. The fiber metal mats employed are designed and fabricated with specific parameters that, together, provide these results. Such mats are made of fibers of ductile, strong corrosion-resistant metal having diameters of between 2 and 80 microns and are fabricated in a manner to produce a mat with a density of between 30% and 70% of the metal fiber material, an average pore size through the mat of from 5 to 100 microns and a thickness of from 1 to 50 millimeters.

It has also been discovered that imparting high frequency energy waves, preferably ultrasonic energy, to a microporous plate markedly increases and maintains the throughput of gas at the same pressure gradient. For this purpose, an ultrasonic generator, preferably a piezoelectric transducer, is placed in wave energy communication with the microporous plate. In microbubble generating cell the ultransonic generator, preferably located adjacent the microporous plate on the gas pressurized side.

The microbubble generators of this invention may be employed in the various industrial and chemical applications, such as aeration of water or other liquids. They are uniquely suitable for marine applications and particularly for distribution along the wetted surfaces of the hulls of vessels to reduce friction. In this application the microbubble generating cells may be mounted in the hull surface with the microporous mat flush with the surface and in communication with the water flow passing along the hull so that the microbubbles generated are carried aftward adjacent the hull surface along with the flow.

As another part of this invention a foil may be utilized as a uniquely effective means for generating and distributing microbubbles along the wetted surface of a vessel. A substantially neutral foil is placed in advance of the bow preferably with the chord of the foil substantially coincident with the vertical centerline plane of the hull of a vessel with the span of the foil extending a substantial distance below the waterline. Microbubbles to be distributed into the path of the bow of a vessel may be advantageously discharged through ports, nozzles or other appropriate openings at the surface of the foil aft of its widemost point. Preferably, microporous plates or other microbubble generators may be situated at the surface of the foil(desirably flush mounted to avoid turbulence).

As the pressure created by the water flow is less at the aft portions of the foil, introduction of the microbubbles is easier and there is less disturbance of the flow. Importantly as well, the microbubbles may thereby introduced into the streamlined flow through which the bow will move and this may be accomplished in a more uniform and precise manner. The placement of the foil permits distribution of the microbubbles not only to the boundary layer at the bow but also to the entire field confronting the bow, thus providing maximum effect. The foil additionally, itself, acts to reduce the occurrence of frictional resistance, spray and turbulence and otherwise limit frictional drag on the wetted surface of the bow. While Applicant does not wish to be bound by any particular theory, it is believed that as the foil moves through the water it "spreads" the water in a uniform or laminar manner and the outward momentum imparted continues as the water reaches the bow, thus decreasing the spreading action required by and reducing the pressure on the less hydrodynamically efficient bow. The foil will allow a shorter bow without sacrificing beam and speed. In effect, the foil acts as an extension of the bow, but at the same time, with only a small limitation on turning ability as compared to a vessel with an extended bow of equivalent performance.

BRIEF DESCRIPTION OF THE DRAWINGS

FIG. 5 is the forward portion of the bow shown in FIG. 4, enlarged, without showing the bulb.

FIG. 6 is an enlargement of the view of the bow of FIG. 3.

FIG. 12 is a breakaway cross-sectional view of the foil wall of the foil of FIG. 11 showing mounted therein a device for microbubble generation in accordance with this invention.

FIG. 13 is a cross-sectional view of an alternative microporous plate for the generator depicted in FIG. 12.

FIG. 14 is a breakaway cross-sectional view of the foil of FIG. 11 taken along line 14—14 showing mounted therein another embodiment of a generator in accordance with this invention.

FIG. 15 is a cross-sectional view across the chord direction of a foil showing microbubble generators mounted therein in accordance with one embodiment of this invention.

FIG. 16 is a cross-sectional view across the chord direction of a foil having microbubble generators mounted therein in accordance with another embodiment of this invention.

FIG. 17 is a cross-sectional view of a foil showing internal microbubble generators in accordance with yet another embodiment of this invention.

SPECIFIC DESCRIPTION OF THE INVENTION

Figure 1:
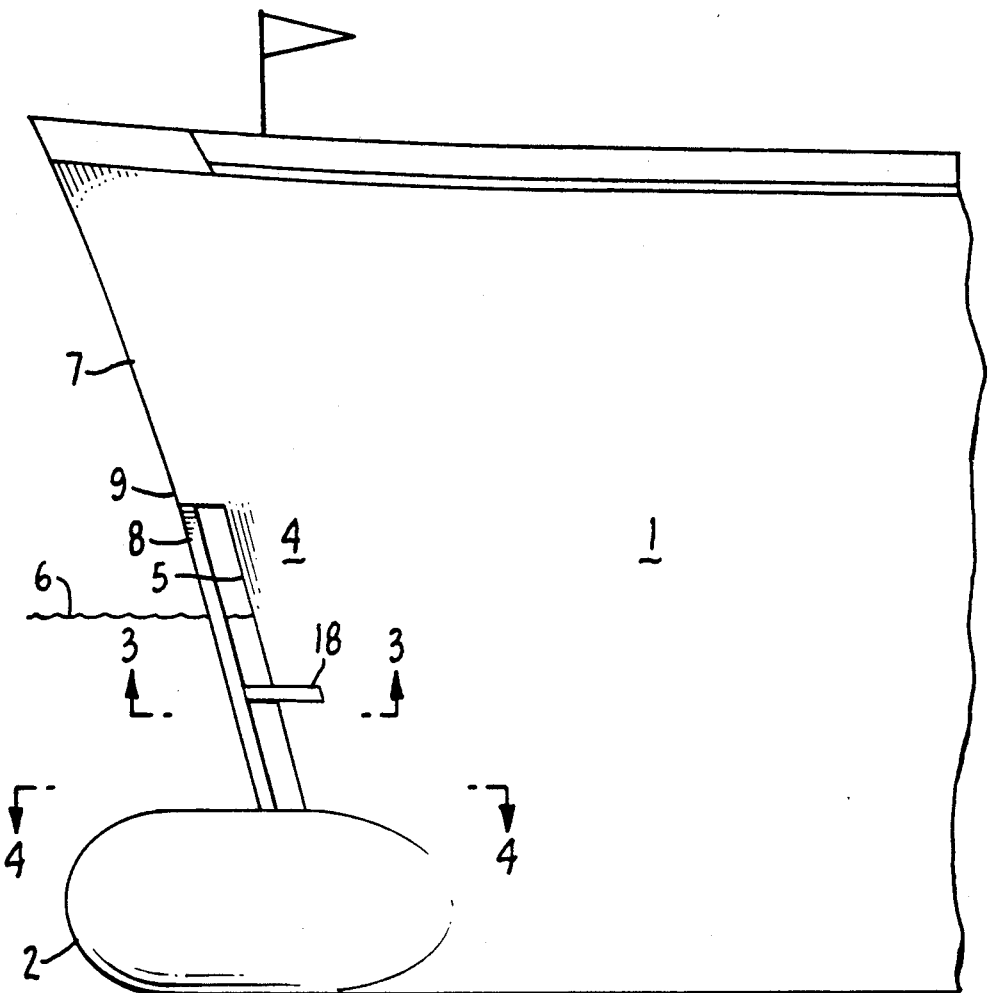
FIG. 1 is a elevational view the forward portion of a vessel embodying the present invention, taken from the port side.
Figure 2:
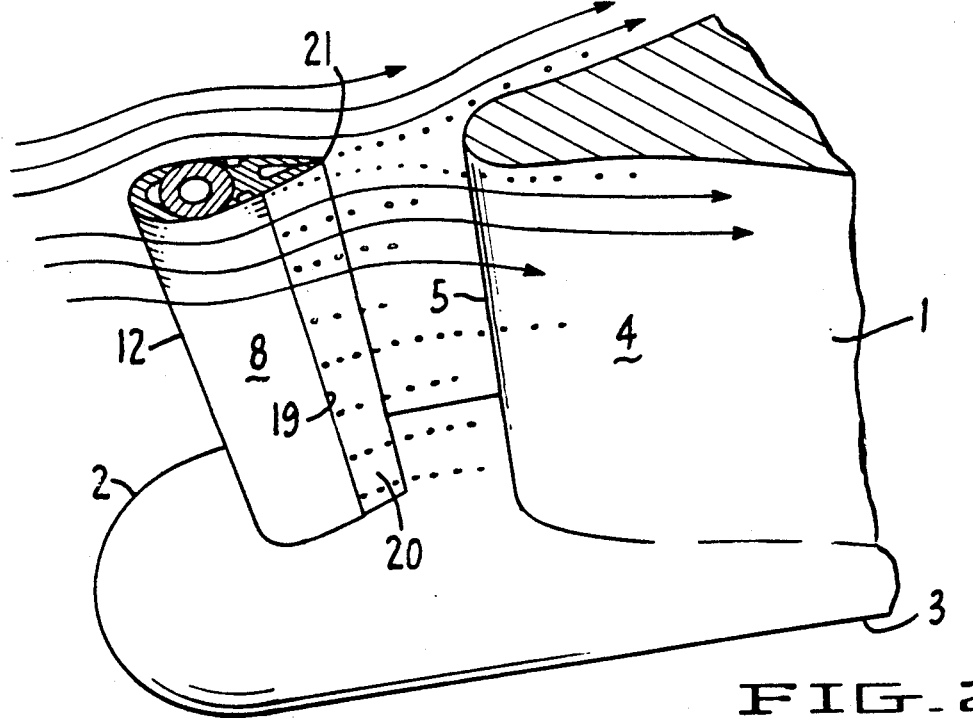
FIG. 2 is an enlarged sectional view taken along lines 4—4 of the lower portion of the bow of the FIG. 1 shown isometrically.
Figure 3:
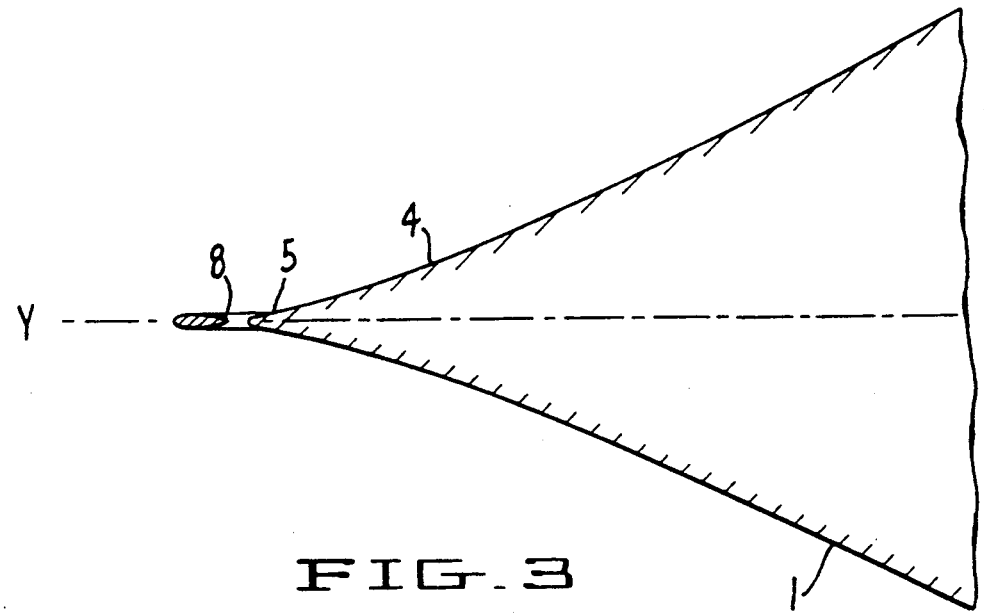
FIG. 3 is a cross-sectional view of the bow of FIG. 1 taken upwardly along lines 3—3.
Figure 4:
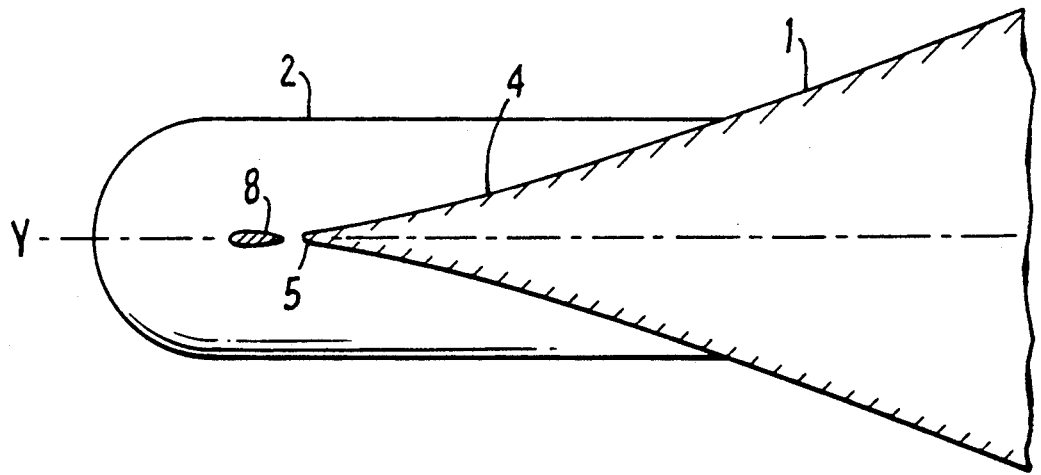
FIG. 4 is an overhead cross-sectional view of the bow of FIG. 1 taken along lines 4—4.
Figure 7:
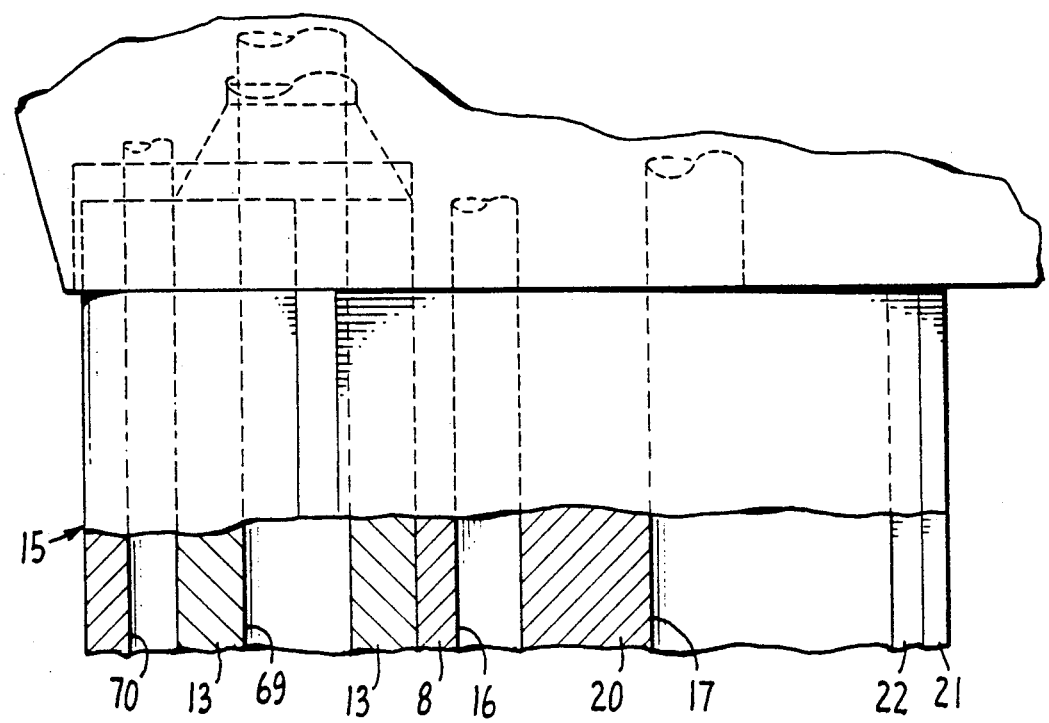
FIG. 7 is an enlarged cutaway view of the upper forward portion of the bow shown in FIG. 1.
Figure 8:
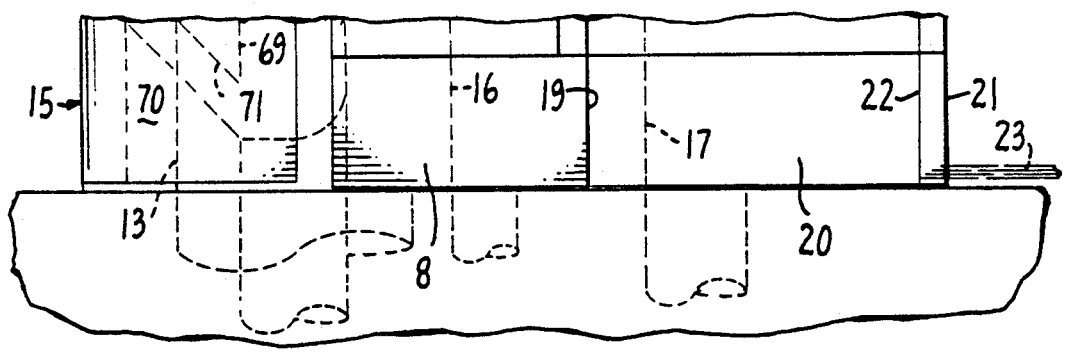
FIG. 8 is an enlarged cutaway of the upper and lower forward portions of the bow shown in FIG. 1.

The foil, as utilized in accordance with this invention, is desirably configured to minimize turbulence and friction both by streamlining of its shape and by providing it with a smooth and polished surface. The foil, desirably, is neutral. That is, configured so as to exert no substantial net force in either direction perpendicular to the direction of movement of the foil in water when its chord extends in the direction of movement. Preferably, the camber or contour of the foil on one side of the chord substantially mirrors that on the other so that the foil is balanced or symmetrical relative to its chord. In its simplest form, for small vessels, the foil may be a thin flat plate rounded at the leading and trailing edges. Generally, however, the foil will vary in thickness throughout its chord direction, in as streamlined fashion. The leading section of the foil extends forward along the chord from the thickest point of the foil to the leading edge. The trailing section of the foil extends along the chord from the thickest point of the foil to the trailing edge.

In general, the foil is desirably big enough in chord length and in thickness, relative to the size of the vessel to impart sufficient outward momentum to the water at service speed to materially decrease the friction on the vessel hull. The thickness of the foil (at its thickest point) in relationship to its length is desirably 1% to 40% of the chord length, with the thickest point located aft of the leading edge a distance equal to 20% to 80% of the chord length and preferably 20% to 60%. In relation to the vessel, the principal variables influencing the choice of thickness of the foil include the design speed of the vessel, its beam and draft and the distance between the bow and the foil. For a slow vessel with a beam of twenty feet or more and a draft greater than one foot, a foil thickness of two inches or greater will usually be more effective. And, for very large, slow vessels, foil thicknesses one to five feet or even as large as fifteen feet may provide better performance. Foils for faster vessel, i.e. above 30 knots design speed, may be relatively thinner, for small vessels even as thin as may be practicable, e.g. one half inch up to two to five inches. As beam and length increase, foil thicknesses of up to sixty inches may be preferred. In general, for faster vessels, the "angle of attack" of the foil (the relative sharpness of its leading edge) is desirably narrower.

The thickness of the foil is preferably the same over its underwater span length. However, the thickness in the span direction may vary, if desired, usually with maximum thickness at the waterline. Desirably, the thickness over the underwater span varies, overall, less than 100%, preferably less than 50%, and most preferably less than 20%.

The chord length of the foil may vary over its span below the waterline, becoming generally narrower towards one end or the other, usually narrower towards the keel line. However, for maximum effect, the chord length variation over the underwater length is desirably less than 100% and preferably less than 50%, most preferably less than 20%.

The foil is desirably positioned on the vertical longitudinal center plane of the vessel, with its chord coincident with such vertical center plane. The span of the foil extends a substantial distance below the waterline of the vessel, and, desirably, from the waterline down to the keel line, or to the bulb, if the vessel is equipped with a bulb. In this context, the waterline is the highest vertical point on the bow that the water reaches when the vessel is fully loaded, moving at design speed in a heavy sea.

Along its span below the waterline the trailing edge of the foil confronts and is spaced forwardly of the bowpeak at any point horizontally adjacent thereof. The term "bowpeak" is intended to mean the forwardmost point of the vessel at any given elevation above or below the waterline. In most cases at most or all elevations this will be the leading edge of the bow but it can also be other structure, such as a bulb, keel or the like.

For best performance the foil is positioned with its trailing edge parallel to the bowpeak throughout its length below the waterline. However, if desired, the foil may be at a different angle to the bowpeak, for example, vertical. As shown in each of FIGS. 1, 9, 10 and 11, the foil is positioned with a forward rake, i.e. inclined forwardly in the upward direction.

The spacing of the foil from the bowpeak is important for optimizing the benefits of this invention. The most appropriate spacing will vary with a number of factors, with the distance generally increasing with the service or design speed and with the beam of the vessel and with the thickness and chord length of the foil, and vice versa. While the spacing may thus vary, the foil should be positioned close enough to the bowpeak that, at the vessel's design speed, a useful amount of outward momentum the foil imparts to the water remains when that water passes the vessel's bow.

Under some conditions, particularly at lower speeds for a vessel with a sharp bowline which is confronted by a foil trailing section which is also quite sharp or thin, enhanced performance may be obtained even with the trailing edge of the foil directly against the bowpeak. However, usually the trailing edge of the foil should be spaced from the bowpeak in order to obtain the full benefits of the invention. That spacing may vary not only in accordance with the factors already mentionedd above, but also with the degree of sharpnes of the bow, the sharpness of the trailing section of the foil and other factors influencing the degree of friction and turbulence that is generated at the region of the foil trailing edge and the bowpeak. However, the bowpeak and the foil trailing edge should desirably be spaced apart a distance such that a continuous streamline condition is maintained in the water as it passes adjacent the foil trailing edge and the bow. The more full or bluff the bow or the trailing section of the foil, the wider the spacing that is needed there between to maintain streamline flow in the adjacent region.

In practice, the foil is desirably spaced from the bowpeak at any horizontal point at a horizontal distance equal to or greater than the maximum thickness of the foil (measured from the trailing edge of the foil). For slower vessels (up to 30 knots design speed) a spacing of between 2% and 25% of the vessel beam width is desirable and, for higher speed vessels, a spacing of between 1% and 30% of beam width. If the trailing edge of the foil is relatively thich, which it may be for slower and smaller vessels, the spacing is desirably narrower, preferably less than the foil thickness.

For larger vessels, to better protect the foil from collision damage, the foil may be positioned at or aft of the vessel's forepeak at the waterline, as will be exemplified in to the embodiment of FIGS. 1 through 8 of the drawings.

Figure 9:
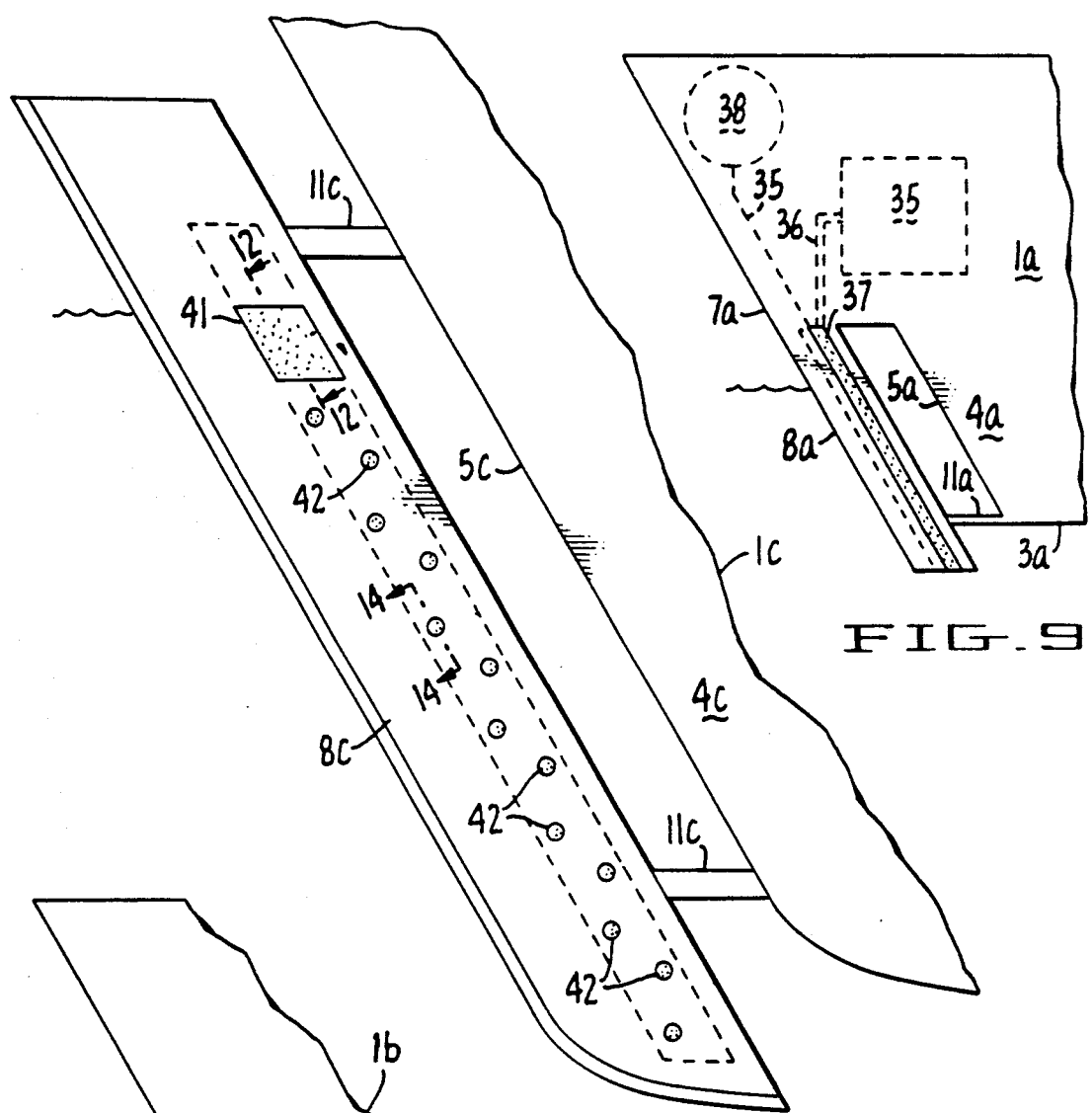
FIG. 9 is an elevational view of the bow of a vessel illustrating a different embodiment of the invention.
Figure 11:
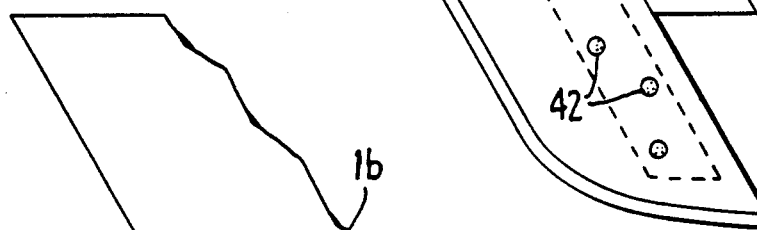
FIG. 11 is a breakaway elevational view of the lower portion of a vessel bow illustrating yet another embodiment of the invention.
Figure 10:
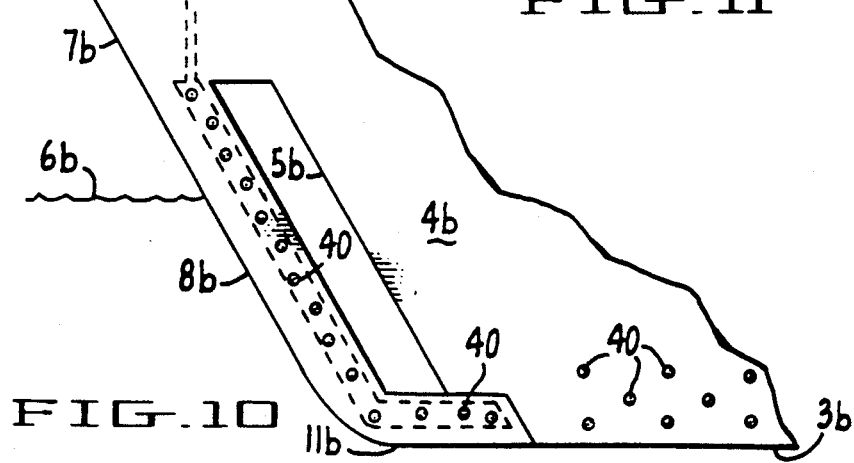
FIG. 10 is an elevational view of the bow of a vessel illustrating yet a different embodiment of the invention.

With reference to the drawings, FIG. 1 through FIG. 8 illustrate an embodiment of the invention applied to very large vessel having an overall length of 920 feet (280.4m.), a beam of 136 feet (41.45m.), at the waterline and a design speed of 30 knots. Vessel 1 has a conventional bulb 2 located adjacent the keel line 3 of bow 4. The leading edge, or bowpeak, 4 of bow 3 below the waterline 6 extends upwardly from bulb 2 to forepeak 7 above the waterline 6, with a total span of 40 feet (12.2 m.). Secured to bulb 2 is foil 8 which extends upwardly therefrom, generally parallel to bowpeak 5 below the waterline, and spaced forewardly thereof, with a gap therebetween of 20 inches (50.2 cm), which is equal to about 42% of the chord distance of the foil (4 feet or 1.22 m.). As better seen in FIG. 3 through FIG. 6, the chord of foil 8 lies along the vertical centerline plane Y of the vessel. At its upper end foil 8 is secured to forepeak 7 adjacent the forepeak leading edge 9. As shown in FIG. 5, the thickest point of the foil, 10.5 inches (26.5 cm), occurs at 10, which is a distance from the leading edge of the foil equal to 28% of the chord length.

Where the foil of this invention is employed with a vessel which does not have a bulb at the bow, the foil may extend down to and, optionally, a distance therebelow, in various configurations as exemplified in FIGS. 9-11. In FIG. 9, foil 8a extends from forepeak 7a of vessel 1a parallel the bowpeak, as in the embodiment of FIG. 1, but foil 8a extends down to keel line 3a and for a short distance therebelow. Foil 8a is secured to bow 4a at its lower end by strut 11a at the keel line. Such a foil extension would be particularly useful for a vessel having structure extending below the keel line, e.g. a centerboard, keel or the like. Alternatively a separate foil may be mounted directly in advance of such structure, either connected to and supported by that structure of by the keel, above.

In FIG. 10 foil 8b is similar to foil 8a of FIG. 9 except that it ends at the keel line and connects to bow 4b at that point by a gently curved and streamlined connecting plate 11b.

In FIG. 11, foil 8c is connected at both ends to the bow peak by struts 11c and extends forward of bow peak 7c throughout the foil span. This embodiment may be more suitable for smaller vessels, due to its simplicity and ease of retrofit. Struts 11c may be provided with an internal channel for conduits connecting vessel 1c with foil 8c for utilities (e.g. compressed air and electricity) for servicing the foil for functions described below.

For other applications, such as a submarine which may have a generally rounded bow or a bow which extends more horizontally than vertically, the foil may be positioned vertically or, in the latter instance, a horizontal foil may be more effective. For multihull vessels, such as a catamaran, a foil may be attached to each hull in a similar fashion as described for a monohull vessel.

If desired, for increased effect, two or more foils may be used in tandem, each with its chord disposed on the vertical centerline plane of the vessel, one in front of the other. For example, with the foil system depicted in FIGS. 1-8, a second foil, having the same configuration size and span as foil 8, may be positioned foreward thereof, spaced therefrom the same distance as the spacing between bowpeak 5 and foil 8. The second foil may be spaced from and secured to foil 8 by struts, similar to those depicted in FIG. 11.

The bow foil may, optionally, be employed as a rudder. As will be described, the leading section of the foil may be mounted to pivot on an axis extending in the span direction to form an angle with the trailing section 20 of the foil, thus, in effect, providing the foil with a variable camber. Pivoting the leading section about this axis from its normal balanced position unbalances the foil to create a turning force in the direction the leading section is pivoted, as the foil moves through the water.

Referring to FIGS. 5-8, leading section 12 of foil 8 comprises rudder stock 13 which is mounted for pivoting at its upper end in casing 14 and is similarly mounted at its lower end (not shown). A rudder turning mechanism or machine (not shown), is provided in forepeak 7 where it engages the upper end of rudder stock 13. Foreward of rudder stock 13 and fixed thereto is rudder 15 which also forms the leading edge of foil 8. For turning movements rudder stock 13 is pivoted, and with it rudder 15, from the neutral position to the desired turn direction, either left or right, as shown in dotted outline at A and B.

Another important feature of this invention is the employment of the bow foil for generating and for dispensing microbubbles. A particular advantage of the bow foil for this purpose is its capability of distributing such agent in advance of the bow to the regions where these agents provide maximum benefit and in a relatively more precise and uniform manner. Additionally, the trailing section of the foil provides an advantageous zone for release of such agents as the dynamic pressure of the water on the foil surfaces in this region are relatively low and the water flow is substantially laminar, with significantly less spray.

A number of alternatives are available for generating and for dispensing microbubbles from the bow foil. In general, microbubbles may be prepared in the vessel and piped to the foil for distribution and release or, preferable, they may be generated (using supplied gas) in or at the surfaces of the foil.

Referring again to FIGS. 1-8, in this embodiment microbubbles are prepared or generatedd in a water system in bow 4. The water containing such agents, e.g. bubbles in suspension, is piped to foil 8 and emitted at orifices at the sides and trailing edge of the trailing section of the foil. Specifically, as shown in FIGS. 5-8, vertical side channels 16 and trailing channel 17 are provided in the interior of foil 8 which are supplied with microbubbles from vessel 1 through conduits from forepeak 7 and bulb 2 (not shown) connecting with these channels 16 and 17 at both the top and bottom ends of foil 8. Additionally, to insure the desired distribution intermediate supply conduits, generally indicated at 18 in FIG. 1, are provided. Conduits 18 are shown in more detail in FIG. 6 together with their connections to channels 16 and channel 17. Supply conduits extend to vessel 1 and they connect to the interior thereof to a microbubble generating system (not shown).

Vertical slit outlets 19 are disposed along each side of trailing section 20 and they are each in communication along their length with channel 16 on their respective sides to provide outlets for releasing the friction reducing agents from their respective channel 16 into the water flowing past. Similarly vertical slit outlet 21 is disposed along trailing edge 22 and is reinforced with stabilizing wing w. Slit 21 is in communication with channel 17 for releasing the friction reducing agents from channel 17 into the water flow at the trailing edge. Optionally, shrouds 23 of flexible material such as film or laminar fiberglass may be attached to trailing edge 22 to trail in the water flow stream to guide the released microbubbles to the bow peak (shown only in FIGS. 5 and 6).

Alternatively, gas bubbles may be generated internally in the foil or at its surfaces for example by utilizing microporous plates.

Metal plates prepared by sintering powdered metal and chemically etching out the pores therein may be used. However, it has been discovered that fiber metal mats, when appropriately designed and used in accordance with this invention, are uniquely suitable for production of a high volume of microbubbles at surprisingly modest pressures and energy consumption.

Fiber metal mats or plates are prepared by compressing randomly laid fine fibers of various metals to the desired density and pore size and sintering the mat to fuse the fibers at crossover points. For this invention the fibers utilized in such mats are of ductile, strong, corrosion-resistant metals, including stainless steel, nickel alloys, such as Inconel 600 and Hastalloy C, and bronze. The diameter of the fibers employed may be between 2 and 80 microns, and preferably between 5 and 40 microns. In manufacture, the mats are desirably pressed to a density above 30% and below 70% and are preferably in the density range between 40 and 60 percent. In general, the mats or plates will have an average pore size as low as 5 microns, but more typically between 10 and 100 microns and preferably below 50 microns. The desired pore size may be achieved by appropriate selection of fiber diameter, the amount of fibers per unit area of the mat, and the amount of compression (and hence density and thickness of the mat).

The air permeability of such mats is desirably greater than 50 and preferably greater than 100 cubic feet per hour per inch of water of pressure differential between the sides thereof (or, expressed in metric, one-half and one cubic meter per hour per centimeter of water pressure differential, respectively), tested at standard conditions, i.e. 20 degrees centigrade, one atmosphere pressure and with a test velocity of 2000 feet (609.6 meters) per hour. The desired permeability, like the desired pore size, may be obtained by appropriate selection of fiber diameter and adjustment of mat thickness and density.

Mats produced in this manner have a surprising uniformity of pore size, i.e. a narrow range of pore size distribution. Average pore size can be measured satisfactorily for purposes of this invention by various conventional procedures that provide an approximation thereof, including measurement by the mercury porisometer or by particle entrapment tests in which fluids containing particles of known size are passed through the mat and the extent of particle retention in the pores is determined.

The thickness of the mat is desirable less than 50 millimeters and, for more efficient operation, less than 40 mm. Mats of a thickness down to about 1.5 mm may be employed where the unsupported areas of the mat are less than 1 square centimeter and preferably are 3 mm or thicker where the unsupported area of the mat is greater. Support structure may be provided, preferably on the inboard side of the mat, to give additional structural strength, such as a perforated plate, woven wire screens or an open honeycomb section ((with the cell walls perpendicular to the mat surface), abutted against the mat inner surface and desirably glued or fused thereto.

The most preferred fiber metal mat consists of 25 micron diameter bronze or stainless steel fibers compressed to a density of 45-50% (of the solid metal) with a thickness of 3 millimeters and having a average pore size of 30 microns (with a size distribution of plus or minus 8 microns). This material is available from Brunswick Corporation under the trademark Feltmetal.

The choice of thickness and size of the microporous plates will vary with the conditions particular application. These plates are mounted at the outside surface, or at an internal location of the foil in water communication with the outside, and provided with a pressurized gas chamber on the back (opposite) side. The pressurized gas flowing through the microporous plate into the water forms bubbles, the size of which may be adjusted by varying the gas pressure, the average pore size of the plate and/or the flow rate of the water passing the plate. Gas bubbles with an average diameter below 50 micron are desirable for effective results, and an average diameter of 40 micron or less is preferred. Additional information and guidance on bubble generation may be found in the literature, including the Madavan et al. articles previously cited.

Referring to FIG. 17, in this embodiment microporous plates 31 are provided in the interior walls of foil 8d. Compressed air is supplied to the back sides of plates 31 by means of conduits extending from the foil to a compressed air source in the vessel (not shown). Water is circulated through chambers 16d to carry the bubbles away from microporous plates 32 and through vertical slit openings 19d into the water streaming past the foil.

In FIG. 15 microporous plates 32 and microporous plate 33 are mounted in channels 16e and in channel 17e, respectively, to emit bubbles directly into the water stream exteriorly of the foil 8e. In this embodiment channels 16e and channel 17e are charged with pressurized gas to be transmitted through plates 32 and 33.

In FIG. 16, also as shown in FIGS. 9-11, microporous plates 34 are mounted in the walls of foil 8f, flush with its surface and in direct communication with the outside. IN FIG. 16 plenum chamber 16f is pressurized (by a compressed air source not shown) to create gas flow through plates 34. Similarly, in FIG. 9 air compressor 35 provides pressurized gas which is fed through conduit 36 to an elongated microporous plate 37 mounted at the surface of foil 8a. Electrical generator 38 also supplies electrical energy through conduit 39 to foil 8a for purposes which will be described below.

FIGS. 10-14 illustrate microbubble generation systems forming another important feature of this invention. In FIG. 10 discrete microbubble generating cells 40 located along the surface of foil 8b to provide a thorough distribution of bubbles in the water field in advance of the bow. Either in place of or supplementary to the foil mounted cells, cells 40 may be located on mounting strut 11b and on hull of vessel 1b, as shown. These cells may be flush mounted and each supplied gas under pressure by piping similarly as shown in detail with respect to the foil embodiment of FIG. 11.

Straight sided cell 41 and round circular cells 42 in FIG. 11 are flush mounted at the exterior surface of foil 8c. As seen in FIG. 12, cell 41 is mounted in an opening through foil wall 43 with casing 44 of cell 41 engaging the sides of the wall opening. Casing 44 is provided with an inboard flange 45 by which it is secured to the inboard side of the foil wall by bolts 46. Microporous plate 47 is attached to the outboard margins of casing 44 by welds or the like. The outboard side of microporous plate 47 is flush with the outboard surface of foil wall 43 and covers the entire wall opening. Backwall 48 is engaged in casing 44 and sealed against plate 47 by an elastomeric seal 49, to form air chamber 50. Nozzles 52 are mounted on back wall 48 in communication with air chamber 50. Conduits 51 connect nozzles 52 with a compressed air source 53 through valves 54. Plate 47 is provided with areas of reduced thickness which permit increased flow of gas (at a given pressure) without unduly compromising the strength of the plate, in order to maintain integrity of the hull. An alternative microporous plate for cell 41 is depicted in FIG. 13. Microporous plate 56 is thinner throughout its entire cross-section and structural integrity is provided by backing plate 57 at its inboard surface which serves to reinforce plate 56 while permitting passage of gas thereto through its openings 58. This combination may replace plate 47 in cell 41, if desired.

Yet a further important feature of the microbubble generating cell systems is based of the discovery that impingement of high frequency wave energy on the microporous plates surprisingly enhances the throughput of gas, thereby materially improving their efficiency in bubble production. High frequency wave energy utilized is, in general, between one kilohertz and one megahertz, and preferably in the range of 10 to 90 kilohertz. Placement of the wave generator preferably an electroacoustic or electromechanical transducer, relative to the microporous plate is not critical so long as the energy directly impinges on the plate (through an air gap) or is conducted to the plate through structure adjacent or in contact therewith. In addition to enhancing gas diffusion through the microporous plate, the wave energy also serves the important function of cleaning the plate of biological matter and other fouling that occurs in a marine environment.

Again referring to FIG. 12, transducer 59, a piezoelectric crystal with a natural frequency of 50 kilohertz secured to metalized layer electrodes for activation, available from Vernitron Corp., is secured to the inboard surface of back wall 48 which acts as a conductor of the wave energy from the transducer to air chamber 50. Transducer 59 is connected through wires 60 with a high voltage piezoelectric transducer driver (not shown) capable of 320 volt (peak) to generate an output through the frequency range of 10 KHz to 100 KHz.

Microbubble generating cell 42 of FIG. 14 is constructed essentially as cell 41 of FIG. 12, except that cell 42 is circular and its casing 61 has an integral back wall which bounds air chamber 62 and communicates with conduit 63 supplying gas under pressure to air chamber 62. Aluminium support plate 64 is mounted in air chamber 62 for supporting and conducting wave energy from piezoelectric transducer 65 secured thereto. Support plate 64 contains openings 66 therethrough for passage of gas through chamber 62 to a microporous plate 67.

The foregoing cells are useful for either original installations or for retrofitting foil or vessels, particularly circular cells, as described having a cross-sectional area of effective surface of between 2 and 10 square inches (or around 10 to 70 square centimeters). For example two inch (5 cm) diameter circular cells may be distributed along the vessel hull and foil, as depicted, to achieve efficient and effective coverage.

The flow rate from the various microbubble generating systems described may be adjusted for the particular speed of the vessel and other conditions, by regulating the gas pressure supplied to the back side of the plate so as to provide a flow of bubbles which, will remain adjacent the wetted surface of the vessel a substantial distance, desirably to midships.

As shown in FIGS. 15-17, electric resistance heating strips 68 may, optionally, be secured to the inner surface of the leading sections 12d, 12e and 12f of foils 8d, 8e and 8f respectively, and extend along the span thereof. Electrical conduits (not shown) connect from a power source on the vessel to heating strips 68. Heating strips 68 heat the foil surfaces which, in turn, heat the water passing the foil to decrease water viscosity. This lowers the frictional resistance of the water not only on the foil surfaces but also on the wetted surface of the bow as the warmed water reaches those surfaces. Another mode of heating the foil surfaces is shown in FIGS. 5-8. Rudder stock 13 and rudder 15 have vertical channels 69 and 70, respectively. These channels may be utilized to heat the surfaces of leading section 12 by circulating heating media through them. Heating media, such as hot water, may be piped to the upper end of rudder channel 70, circulated to rudder stock channel 69 at the lower end through connector pipe 71 and then removed at the upper end of channel 69 and piped back to vessel 1 for reheating.

I claim:

1. A vessel of improved performance capability having at least one hull and a foil forward of at least a portion of the bowpeak of said hull below the waterline thereof and positioned with its trailing edge spaced forward of and confronting said bowpeak portion, said foil being elongated generally in the direction along said bowpeak portion, in proportion to the width of the foil in the fore-and-aft direction, and being elongated in the fore-to-aft direction, in proportion to the thickness of the foil transverse to the fore-to-aft direction, and means located at said foil for generating and dispensing microbubbles into the path of the bow of the hull, said means for generating and dispensing microbubbles comprising at least one cell for generating gas microbubbles underwater, said cell having an outer wall exposed to contact with water when submerged, a chamber in said cell adapted for receiving gas under pressure, a microporous mat forming at least a portion of said outer wall with the inner side of said mat in gas flow communication with said chamber, said mat comprising compressed, non-woven metal fibers bonded at crossing points, the average pore diameter of the pores through said mat being between about 5 and 100 microns and the density of said mat being below 70 percent of the density of said fibers, and wave generating means located adjacent said mat on the pressurized side thereof, said wave generating means comprising a piezoelectric transducer capable of generating wave energy having a frequency of between ten to ninety kilohertz.

2. A cell for generating gas microbubbles underwater, said cell having an outer wall exposed to contact with water when submerged, a chamber in said cell adapted for receiving gas under pressure, means for supplying a gas under pressure into said chamber, a microporous mat forming at least a portion of said outer wall with the inner side of said mat in gas flow communication with said chamber and, in wave energy impinging relationship to said mat, means for generating wave energy having a frequency of at least one kilohertz.

3. A method of generating microbubbles in a body of water which comprises placing in direct contact with said water one side of a microporous mat capable of producing microbubbles in said water when gas under pressure is applied to the other side thereof, impinging upon said mat wave energy having a frequency of between ten and ninety kilohertz while gas under pressure is applied to said other side.

4. A cell for generating gas microbubbles underwater, said cell having an outer wall exposed to contact with water when submerged, a chamber in said cell adapted for receiving gas under pressure, and a microporous mat forming at least a portion of said outer wall with the inner side of said mat in gas flow communication with said chamber, said mat comprising compressed, non-woven metal fibers bonded at crossing points, the average pore diameter of the pores through said mat being between about 5 and 100 microns and the density of said mat being below 70 percent of the density of said fibers, and, in wave energy impinging relationship to said mat, means for generating wave energy having a frequency of at least one kilohertz.

5. A cell as in claim 4 and wherein said fibers are comprised of corrosion resistant metal, have an average diameter of between 2 and 80 microns and are fused at crossing over points by sintering and the thickness of said mat is between 1.5 and 50 millimeters.

6. A cell as in claim 5 and wherein said fibers are comprised of stainless steel, nickel alloy are bronze and have an average diameter of between 5 and 40 microns and wherein the density of said mat is between 30 and 60 percent of the density of said fibers and the air permeability of said mat at standard conditions is greater than 50 cubic feet per hour per inch of water of pressure differential between the sides thereof.

7. A cell as in claim 5 and wherein said cell is for mounting at an opening in the hull wall of a vessel to generate gas bubbles at the outside of said wall and comprises a casing having an inboard and an outboard side as mounted at said opening, said microporous mat being located at said outboard side and being adapted for being received by said opening and said casing having means inboard of said mat for sealingly securing said cell in a hull wall opening and having at least one opening inboard of said mat and in flow communication with said chamber, said opening being adapted for receiving gas under pressure and wherein said wave generating means is a piezoelectric transducer capable of generating wave energy having a frequency of between ten and ninety kilohertz located adjacent said mat on the pressurized side thereof.

8. A cell as in claim 5 and wherein said means for generating wave energy comprises a piezoelectric transducer located in said chamber in wave energy impinging relationship with said mat, said transducer capable of generating wave energy having a frequency of between ten and ninety kilohertz.

9. A cell as in any of claims 4 through 6 and wherein said means for generating wave energy is a piezoelectric transducer and the frequency of wave energy generated thereby is between ten and ninety kilohertz.

10. A cell as in claim 9 and wherein said wave energy generating means is located adjacent said mat on the pressurized side thereof.

11. A vessel having at least one hull and at least one cell of any claims 4 through 6 below the waterline of said hull with said mat exposed to the flow passing the surfaces of said hull and positioned so that microbubbles generated by said cell will be carried by said flow along said surfaces and wherein said means for generating wave energy includes a piezoelectric transducer capable of generating wave energy having a frequency of between ten to ninety kilohertz, said transducer being located adjacent said mat on the pressurized side thereof.

12. A method of generating microbubbles in a body of water which comprises placing in direct contact with said water one side of a mat of compressed, non-woven metal fibers bonded at crossing points, the average pore diameter of the pores through said mat being between about 5 and 100 microns and the density of said mat being below 70 percent of the density of said fibers, applying gas under pressure to the other side of said mat and impinging upon said mat wave energy having a frequency of between ten and ninety kilohertz while said gas under pressure is applied to said other side.

* * * * *